(12) United States Patent
Herrick

(10) Patent No.: US 10,206,336 B2
(45) Date of Patent: Feb. 19, 2019

(54) GREENHOUSES

(71) Applicant: John Martin Herrick, Henderson (NZ)

(72) Inventor: John Martin Herrick, Henderson (NZ)

( * ) Notice: Subject to any disclaimer, the term of this patent is extended or adjusted under 35 U.S.C. 154(b) by 49 days.

(21) Appl. No.: 14/926,460

(22) Filed: Oct. 29, 2015

(65) Prior Publication Data

US 2016/0120135 A1    May 5, 2016

(30) Foreign Application Priority Data

Oct. 31, 2014 (NZ) ........................................ 701580

(51) Int. Cl.
*A01G 9/16* (2006.01)

(52) U.S. Cl.
CPC ..................... *A01G 9/16* (2013.01)

(58) Field of Classification Search
CPC .......... A01G 9/16; A01G 9/14; A01G 9/1407; A01G 9/1415; A01G 9/241; A01G 13/04; E04B 1/34321; E04B 1/34315; E04B 2007/066; E04B 1/0046; Y10S 52/17; Y02A 40/254; Y02A 40/252
USPC ........................................ 52/202, 476, 775
See application file for complete search history.

(56) References Cited

U.S. PATENT DOCUMENTS

| | | | | |
|---|---|---|---|---|
| 159,346 A | * | 2/1875 | Musgrove | A01G 9/16 47/17 |
| 1,266,131 A | * | 5/1918 | Krantz | A01G 13/04 47/29.3 |
| 2,019,831 A | * | 11/1935 | Ricardo | A01G 9/16 114/49 |
| 2,231,065 A | * | 2/1941 | Gabel | E04B 1/08 52/219 |
| 2,526,313 A | * | 10/1950 | Zaroban | A01G 13/04 312/140 |
| 2,631,340 A | * | 3/1953 | Decker | E06B 3/28 52/202 |
| 2,784,814 A | * | 3/1957 | Bright | E04D 3/08 24/293 |
| 2,869,561 A | * | 1/1959 | Harkness | E04H 15/36 135/115 |
| 3,184,802 A | * | 5/1965 | Levy | E06B 7/28 160/135 |
| 3,213,585 A | * | 10/1965 | Harry | E06B 3/5481 52/456 |
| 3,333,373 A | * | 8/1967 | Taylor | E04H 15/008 135/120.3 |
| 3,380,210 A | * | 4/1968 | Neal | E04B 2/96 52/235 |

(Continued)

*Primary Examiner* — James M Ference
(74) *Attorney, Agent, or Firm* — Colin P. Abrahams

(57) ABSTRACT

A greenhouse having glass panels that is designed to capture and retain warmth in the colder months may be totally unsuitable for use in the warmer months as the conditions inside may be too hot. And conversely, for a structure designed to keep plants cooler during hot weather. This invention provides a building or structure that can easily be modified to provide improved growing conditions for plants in a range of seasons. This is made possible by a construction that facilitates easy removal and replacement of the major panels of the building, for example glass panels can quickly be replaced with shade panels when the seasons change from cold to hot. The top rails of the structure include a removal section providing access to remove both side wall panels and roofing panels.

16 Claims, 3 Drawing Sheets

(56) References Cited

U.S. PATENT DOCUMENTS

Figure 1:
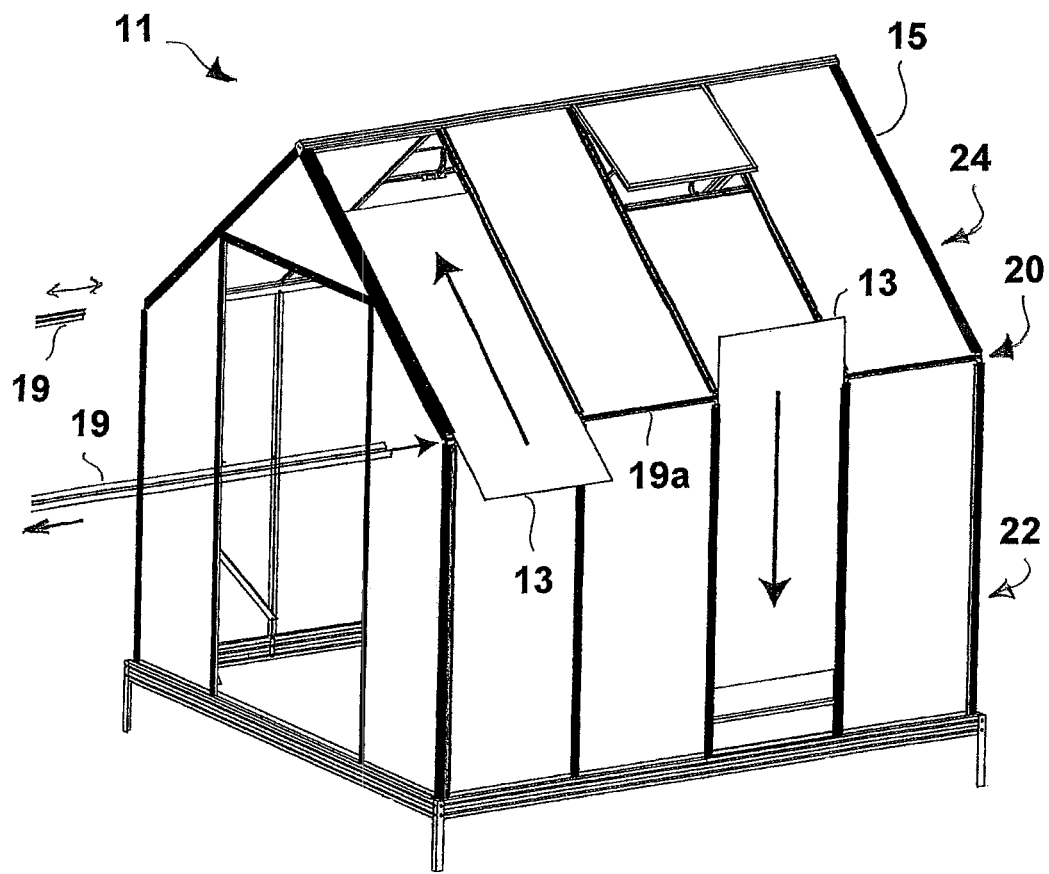

| | | | | |
|---|---|---|---|---|
| 3,429,601 A * | 2/1969 | Bremers | E04B 2/766 | 403/230 |
| 3,751,865 A * | 8/1973 | Brigham | E04B 1/34326 | 52/474 |
| 3,869,827 A * | 3/1975 | Anderson | A01G 9/16 | 47/17 |
| 3,919,813 A * | 11/1975 | Beindorf | E04B 1/3211 | 52/745.08 |
| 3,987,597 A * | 10/1976 | Smrt | A01G 9/16 | 52/222 |
| 4,038,791 A * | 8/1977 | Atkinson | A01G 9/14 | 312/102 |
| 4,057,941 A * | 11/1977 | Schwartz | A01G 9/16 | 47/17 |
| 4,068,421 A * | 1/1978 | Marovich | A01G 9/1407 | 47/17 |
| 4,192,562 A * | 3/1980 | Bishoff | A47B 87/02 | 211/189 |
| 4,261,144 A * | 4/1981 | Rizzo | E04B 2/7433 | 160/392 |
| 4,274,234 A * | 6/1981 | Abell | A01G 9/1415 | 52/222 |
| 4,353,193 A * | 10/1982 | Sanderson | B44C 5/043 | 52/311.2 |
| 4,462,390 A * | 7/1984 | Holdridge | A01G 9/243 | 126/400 |
| 4,501,099 A * | 2/1985 | Boaz | A01G 9/16 | 52/79.4 |
| 4,571,899 A * | 2/1986 | Minter | E04B 1/0046 | 52/395 |
| 4,583,333 A * | 4/1986 | Minter | E04B 1/0046 | 52/262 |
| 4,601,139 A * | 7/1986 | Esposito | A01G 9/14 | 403/199 |
| 4,683,686 A * | 8/1987 | Ozdemir | E04B 1/34305 | 52/63 |
| 4,831,793 A * | 5/1989 | Galloway | A01G 9/16 | 52/86 |
| 4,858,405 A * | 8/1989 | Christie | E06B 3/28 | 52/202 |
| 4,884,376 A * | 12/1989 | DeBlock | E04B 1/0046 | 52/295 |
| 4,901,484 A * | 2/1990 | Santosuosso | E04H 3/16 | 52/63 |
| 4,991,364 A * | 2/1991 | Nilsson | E04B 1/0046 | 52/773 |
| 5,040,839 A * | 8/1991 | Moore | B60J 3/0204 | 296/97.11 |
| 5,046,546 A * | 9/1991 | Benedyk | E06B 9/521 | 160/371 |
| 5,056,259 A * | 10/1991 | Allen | A01G 9/14 | 47/17 |
| 5,060,415 A * | 10/1991 | Schleip | A01G 9/16 | 47/19.2 |
| 5,426,899 A * | 6/1995 | Jones | E04B 7/14 | 135/908 |
| 5,487,690 A * | 1/1996 | Stoffle | A63H 33/10 | 16/225 |
| 5,540,014 A * | 7/1996 | Smith | E04C 2/54 | 135/118 |
| 5,555,681 A * | 9/1996 | Cawthon | A01G 9/16 | 135/119 |
| 5,568,707 A * | 10/1996 | Ishikawa | E04B 1/0046 | 52/200 |
| 5,636,481 A * | 6/1997 | De Zen | E04B 7/205 | 52/522 |
| 5,647,181 A * | 7/1997 | Hunts | A63H 33/10 | 312/111 |
| 5,660,002 A * | 8/1997 | Lashinger | A01G 9/16 | 135/119 |
| 5,678,383 A * | 10/1997 | Danielewicz | E04D 3/06 | 52/235 |
| 5,706,620 A * | 1/1998 | De Zen | E04B 1/12 | 52/220.2 |
| 5,729,944 A * | 3/1998 | De Zen | E04B 1/12 | 264/154 |
| 6,003,279 A * | 12/1999 | Schneider | E04B 1/0046 | 403/230 |
| 6,098,335 A * | 8/2000 | Brown, Jr. | A01G 9/16 | 47/17 |
| 6,141,902 A * | 11/2000 | Boice | A01G 9/16 | 206/223 |
| 6,164,024 A * | 12/2000 | Konstantin | E04D 3/08 | 52/200 |
| 6,192,643 B1 * | 2/2001 | Zadok | E04B 1/0046 | 52/204.1 |
| 6,338,226 B1 * | 1/2002 | Gauthier | A01G 9/14 | 47/17 |
| 6,438,913 B1 * | 8/2002 | Ishikawa | E04B 2/96 | 403/321 |
| 6,499,260 B2 * | 12/2002 | Kasinger | A01G 9/16 | 220/7 |
| 6,510,635 B1 * | 1/2003 | Rudolph | G09F 1/12 | 248/489 |
| 6,591,558 B1 * | 7/2003 | De Zen | E04B 1/12 | 52/91.1 |
| 6,618,988 B2 * | 9/2003 | Williams | A01G 9/16 | 135/122 |
| 6,668,495 B1 * | 12/2003 | Prince | E04C 3/06 | 160/391 |
| 7,448,154 B1 * | 11/2008 | Kludt | G09F 9/33 | 40/446 |
| 7,676,994 B2 * | 3/2010 | Liang | A01G 9/16 | 47/17 |
| 7,748,162 B1 * | 7/2010 | Necessary | A01G 9/16 | 47/17 |
| 7,814,727 B2 * | 10/2010 | LaCasse | E04B 1/0046 | 52/222 |
| 7,861,473 B1 * | 1/2011 | Green | E06B 9/52 | 52/204.1 |
| 7,971,404 B2 * | 7/2011 | Timko | E04F 13/0819 | 403/291 |
| 7,971,597 B2 * | 7/2011 | Reyen | E04H 15/18 | 135/119 |
| 8,484,926 B1 * | 7/2013 | Caruso | E06B 9/52 | 52/222 |
| 8,505,246 B1 * | 8/2013 | Cadorath | E04B 7/163 | 52/66 |
| 8,627,630 B2 * | 1/2014 | Oberbroeckling | E06B 3/7001 | 160/90 |
| 2004/0111983 A1 * | 6/2004 | Rozenberg | A01G 9/16 | 52/79.1 |
| 2004/0118038 A1 * | 6/2004 | Hilel | A01G 9/16 | 47/17 |
| 2004/0206013 A1 * | 10/2004 | Berg | E04H 15/44 | 52/63 |
| 2005/0028949 A1 * | 2/2005 | Winner | E06B 9/52 | 160/371 |
| 2005/0120646 A1 * | 6/2005 | Konstantin | E04D 3/08 | 52/200 |
| 2006/0191209 A1 * | 8/2006 | Reisman | E04B 1/34315 | 52/36.2 |
| 2007/0028512 A1 * | 2/2007 | McGhee | A01G 9/16 | 47/17 |
| 2007/0251180 A1 * | 11/2007 | Gosling | E04B 2/7455 | 52/582.1 |
| 2007/0261316 A1 * | 11/2007 | Reiff | E04H 3/16 | 52/64 |
| 2008/0028700 A1 * | 2/2008 | Wu | A01G 9/16 | 52/200 |
| 2008/0104908 A1 * | 5/2008 | Jensen | A47G 5/00 | 52/241 |
| 2008/0163563 A1 * | 7/2008 | Sciglia | E04H 3/165 | 52/63 |
| 2008/0222991 A1 * | 9/2008 | Wood | E04B 1/0046 | 52/656.1 |
| 2009/0165401 A1 * | 7/2009 | Smalley, III | E04B 1/34315 | 52/91.3 |

(56) References Cited

U.S. PATENT DOCUMENTS

| | | | |
|---|---|---|---|
| 2010/0050556 A1* | 3/2010 | Burns | E04B 1/34321 52/592.1 |
| 2010/0300003 A1* | 12/2010 | Goode | E06B 3/72 49/504 |
| 2011/0078950 A1* | 4/2011 | Rasmussen | A01G 9/16 47/20.1 |
| 2011/0179722 A1* | 7/2011 | Schulz | E04H 5/02 52/79.1 |
| 2012/0042568 A1* | 2/2012 | Keith | A01G 9/16 47/66.6 |
| 2012/0042601 A1* | 2/2012 | Perkins | E04H 1/1205 52/651.11 |
| 2013/0008105 A1* | 1/2013 | Thomson | E04H 9/14 52/205 |
| 2016/0120135 A1* | 5/2016 | Herrick | A01G 9/16 47/17 |

* cited by examiner

GREENHOUSES

FIELD OF THE INVENTION

This invention relates to greenhouses, and in particular, but not exclusively to a method of construction for a greenhouse.

BACKGROUND

Greenhouses typically comprise a framework structure that supports a large number of panels of glass, plastic or a screen material.

There is generally a requirement to let as much light pass through the structure as possible, and for this reason there is a desire to keep the size and quantity of any structure to a minimum.

If not well constructed, and particularly if the structure is slender and not well braced, and if the panels are not secured well, a greenhouse can be relatively flimsy, or it can tend to rattle or be buffeted by wind.

Greenhouses and other horticultural structures are generally designed to facilitate a particular range of growing conditions, or to at least provide a more consistent growing conditions, than are available outside. However, a greenhouse having glass panels that is designed to capture and retain warmth in the colder months may be totally unsuitable for use in the warmer months as the conditions inside may be too hot. And conversely, for a structure designed to keep plants cooler during hot weather.

The relatively fragile nature of many greenhouses limits their suitability for modification or adjustment once assembled.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT

It is therefore an object of the present invention to provide a greenhouse, or a method of constructing greenhouses, which will at least go some way towards overcoming one or more of the above mentioned problems, or at least provide the public with a useful choice.

STATEMENTS OF THE INVENTION

Accordingly, in a first aspect, the invention may broadly be said to consist in a greenhouse comprising;
a plurality of panels, and
a framework structure which includes channels configured to hold the panels;
and wherein the greenhouse includes at least one movable section of framework that can be moved to a first position in which the or each movable section of frame retains one or more of the panels within the framework, and can be moved to a second position in which the or each movable section of frame allows one or more of the panels to be removed and/or installed.

Preferably the panels are panels selected from the following options: glass panels, polycarbonate panels, acrylic panels, shade panels and/or screen or mesh panels.

Preferably the or each movable section of framework is a slidable section of framework.

Optionally the or each movable section of framework is a hinged section of framework.

Preferably the or each movable section of framework forms a part of a top plate of one or more sidewalls of the greenhouse.

Preferably the or each movable section of framework forms a part of a facia panel, gutter or lower rail of one or more roof sections of the greenhouse.

Preferably the or each movable section of framework includes, or forms a part of, a channel that is used to secure panels of the greenhouse.

Preferably the framework comprises a plurality of sections made from aluminium extrusions.

Preferably the or each movable section of framework is configured to slide longitudinally within a fixed section of framework of the greenhouse.

Preferably the or each top plate of the greenhouse frame comprises two members, a first top plate member being a fixed member, and a second top plate member being the movable section of framework.

Preferably the second top plate member engages with the first top plate member using a longitudinal sliding engagement means.

Preferably the greenhouse also includes a compression strip or strips configured to wedge the edges of the panels within the channels.

Preferably the compression strips are made of a rubberized material or a material having rubber-like properties.

In a second aspect, the invention may broadly be said to consist in a multi-role horticultural structure incorporating the features of a greenhouse substantially as specified herein.

In a third aspect, the invention may broadly be said to consist in a kit of parts for forming a greenhouse or multi-role horticultural structure substantially as specified herein when assembled, said kit including;
sections of framework for use in constructing the frame of the greenhouse or structure,
panels having a range of properties for use in the construction of the greenhouse or structure, and
compression strips configured to securely wedge the panels within the framework.

Preferably the compression strips are made of a rubberized material or a material having rubber-like properties.

Preferably the kit of parts includes compression strips of a plurality of widths.

Preferably the sections of framework are formed from aluminium extrusions.

In a fourth aspect, the invention may broadly be said to consist in a method of modifying the properties or role of a greenhouse or horticultural structure of the type having a framework which supports a plurality of panels within channels in the framework, the method including the steps of
withdrawing compression strips from the channels of the framework surrounding one or more of the panels of the greenhouse or horticultural structure,
moving one or more movable sections of the framework to allow one or more of the panels of the greenhouse or horticultural structure to be removed,
replacing the removed panels with panels having properties that are different to those of the removed panels,
re-positioning each of the movable sections of the framework that were moved to secure each of the replaced panels, and placing compression strips into the channels of the framework surrounding each of the replaced panels.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

DESCRIPTION

Figure 2:
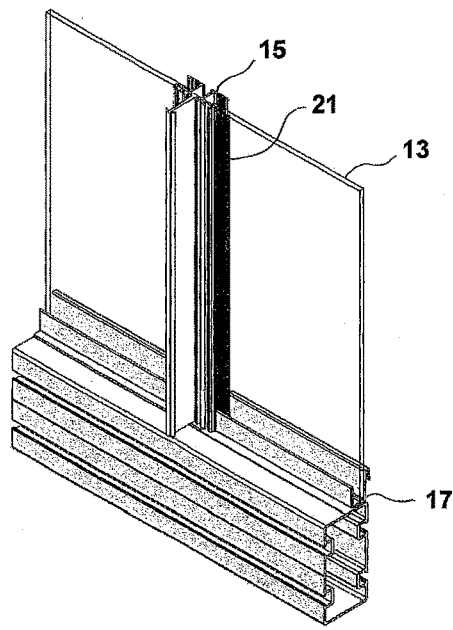
Figure 3:
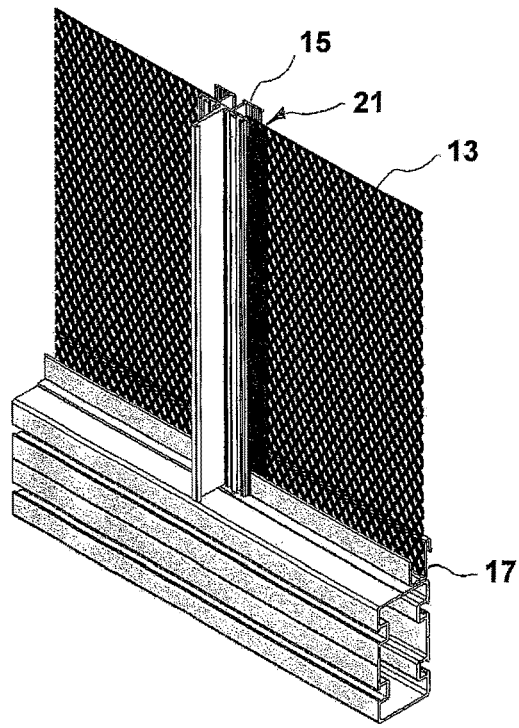
Figure 4:
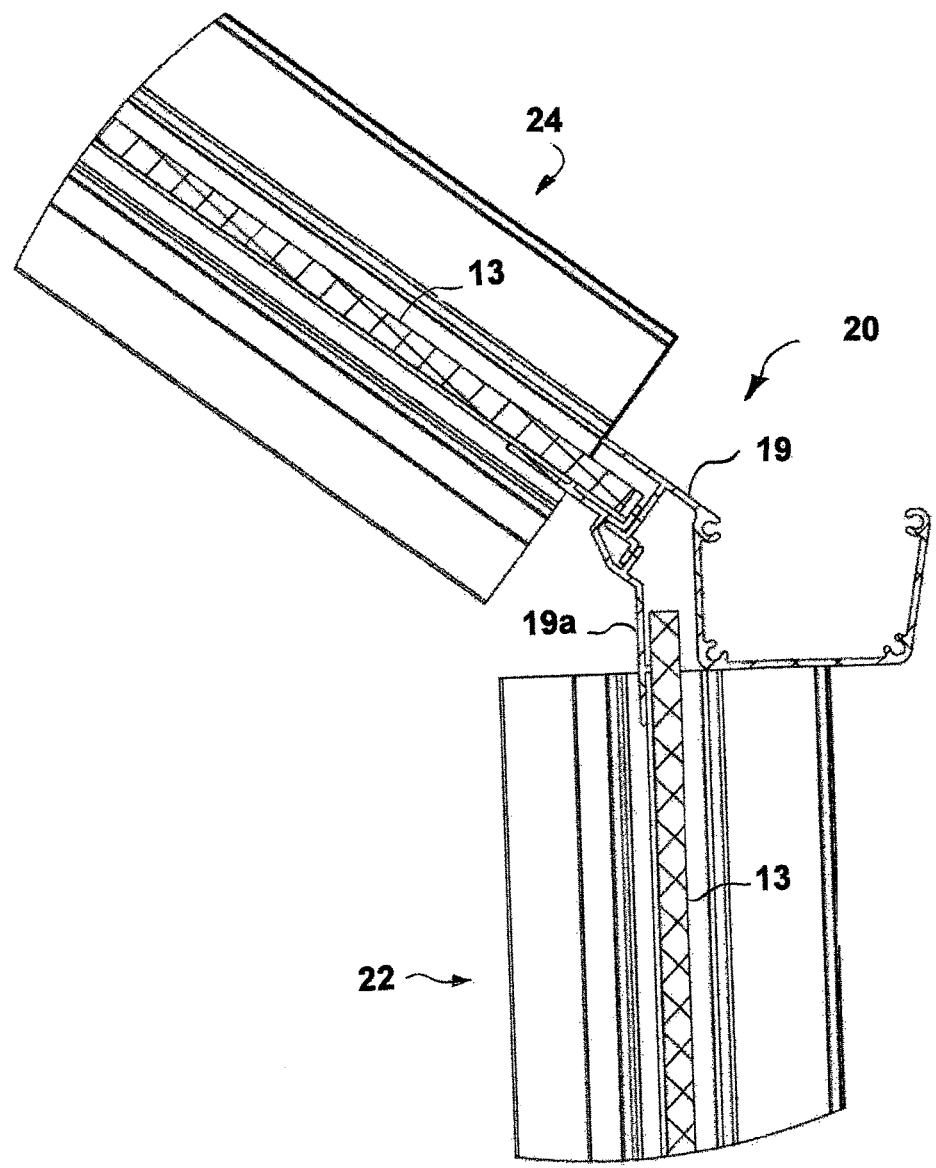

Further aspects of the present invention will become apparent from the following description which is given by way of example only and with reference to the accompanying drawings in which:

FIG. 1 is a perspective view of a greenhouse according to the present invention, FIG. 2 is a perspective view of a section of the framework of the greenhouse with a glass panel installed, FIG. 3 is a perspective view of a section of the framework of the greenhouse with a shade panel installed, and FIG. 4 is a cross sectional view of a top plate of the greenhouse showing a removal section of framework.

With reference to FIGS. 1 to 4, a greenhouse or horticultural structure (11) according to the present invention will now be described. The greenhouse (11) is made of a number of panels (13) and a framework structure (15) which includes channels (17) configured to hold the panels.

An important feature of the greenhouse (11) is that it is a multi-role structure. This multi-role feature is possible due to the fact that the main panels (13) of the structure can be interchanged with panels having different properties. For example glass panels can be removed and can be replaced with mesh or shade panels. This change in configuration is useful to allow the greenhouse (11) to be used effectively during any season of the year or to produce a range or growing conditions.

This multi-role feature is made possible by constructing the framework (15) in such a manner that one or more of the sections of framework is easily moved to allow panels to be slid out of the channels (17) of the adjacent framework (15).

In this example, the greenhouse (11) includes two movable sections of framework (19), which in this case are slidable relative to the remainder of the framework (15). Each of these movable sections (19) can be slid to a first position, or an installed position, in which they retain the panels (13) on each side of them. And they can be moved to a second position, or a removed position, in which the movable sections (19) allow the adjacent panels (13) to be removed and/or installed.

With reference to FIG. 4 it can be seen that the movable sections of framework (19) are in the form of capping or finishing extrusions that are configured to engage with the remainder of the framework (15). In this example, the movable sections of framework (19) form part of a top plate (20) of the sidewalls (22). The top plate (20) of each sidewall of the greenhouse (11) is also a facia panel or lower rail of the roof sections (24).

The movable sections of framework (19) each engage with a first top plate member or fixed section (19a) of the top plate (20) to complete each top plate (20). The movable sections of framework (19) can be called a second top plate member, and when engaged with the first top plate members (19a), they complete each top plate (20). When engaged with the first top plate member (19a) of the top plates (20), the movable sections of framework (19) secure the panels (13) in both the side walls (22) and the roof sections (24).

The movable sections of framework (19) engage with the first top plate member (19a) to form the top plate (20) by means of a sliding joint. Both the first top plate member (19a) and the movable sections of framework (19) are typically formed as aluminium extrusions and are configured such that one can slide longitudinally, or lengthwise, within the other. It can be seen in FIG. 4 that the fixed section (19a) includes an elongate cavity or socket which is configured to receive a complimentary elongate male portion of the movable section of framework (19). The male portion of the extrusion forming the movable section of framework (19) is configured to mate with the cavity of the extrusion of the fixed section (19a) is such a manner that the movable section of framework (19) is not able to rotate relative to the fixed section (19a).

The fixed sections (19a) of the top plates (20) maintain the structural integrity of the greenhouse (11) while the movable sections of framework (19) are removed.

In practice, the movable sections of framework (19) also form a gutter of the greenhouse (11).

The panels (13) can be of any type that is desired to suit a particular season or to create a particular growing environment, for example the panels can be made of glass, polycarbonate, acrylic panels, mesh, etc or they can be panels having differing light filtering effects, breathing characteristics, etc.

In this example, the framework (15) is made of a number of sections made from aluminium extrusions, and which are formed with channels (17) that are approximately ten millimeters wide and fifteen millimeters deep. The panels (13) simply slot into the channels (17) and are held by them.

The movable sections of framework (19) include, or complete, the channels of the top plates (20) of the side walls (22), which, as noted above are also the facia panels or lower rails of the roof sections (24). In this way, the movable sections of framework (19) complete the channels that surround each panel (13) when the movable sections of framework (19) are fitted, and they allow the panels (13) to be removed or replaced when they are slid out of position as shown in FIG. 1.

Beading strips, or compression strips (21), are used to secure the panels within the channels (17). Beading strips (21) of differing widths can be used to secure panels of differing widths within the channels (17). The beading strips (21) are configured to wedge the edges of the panels within the channels (17) and in doing so they provide a seal around the edges of the panels (13), and in addition they provide a structural bond between the panels (13) and the framework (15). The structural bond is very helpful as this means that each of the panels becomes a shear web which adds a significant amount of strength and stability to the greenhouse (11).

The beading strips (21) are made of a rubberized material or a material having rubber-like properties. In profile, the beading strips (21) have a central spine and a number of projections from each side of that spine. And partly because of the resilient material that they are made of, and partly due to their flexible shape, the beading strips can be wedged into the channels (17) alongside the edges of the panels (13) to wedge the panels in place and seal around them.

The nature of the beading strips (21) allows them to accommodate some variation in the thickness of the panels (13), however to accommodate a wider variation of panel thickness, beading strips of differing thicknesses can be used.

Therefore a multi-role green house or horticultural structure (11) that includes panels (13) of a range of thicknesses will also include beading strips (21) of a range of widths. For example a green house (11) that uses six millimeter thick glass panels in the winter, and shading mesh that is only two millimeters thick in the summer, will require two sets of beading strips (21), a thinner set to hold the glass and a thicker set to hold the mesh. FIGS. 2 and 3 show these two configurations, with glass panels shown in FIG. 2 and with mesh panels shown in FIG. 3.

The properties or role of the greenhouse or horticultural structure (11) can be modified using the following simple steps;

withdrawing beading strips from the channels of the framework surrounding one or more of the panels of the greenhouse or horticultural structure, moving one or more movable sections of the framework to allow one or more of the panels of the greenhouse or horticultural structure to be removed, replacing the removed panels with panels having properties that are different to those of the removed panels, re-positioning each of the movable sections of the framework that were moved to secure each of the replaced panels, and placing beading strips into the channels of the framework surrounding each of the replaced panels.

VARIATIONS

To those skilled in the art to which the invention relates, many changes in construction and widely differing embodiments and applications of the invention will suggest themselves without departing from the scope of the invention as defined in the appended claims. The disclosures and the description herein are purely illustrative and are not intended to be in any sense limiting.

In the example described above, the greenhouse (11) includes two movable sections (19) of framework (15), however it is envisaged that in differing embodiments the greenhouse (11) could include only one, or any number of movable sections (19).

Also, in the example described above, the greenhouse (11) includes movable sections (19) that are slidable, however, it is envisaged that the movable sections (19) could be pivotally connected to the framework (15) and/or be attached using removable fasteners.

Definitions

The term "greenhouse" used herein is intended to mean an enclosed structure that is used for the cultivation or protection of plants. The term is intended to include glass-houses, shade-houses and similar horticultural structures.

Throughout this specification the word "comprise" and variations of that word, such as "comprises" and "comprising", are not intended to exclude other additives, components, integers or steps.

ADVANTAGES

Thus it can be seen that at least the preferred form of the invention provides a greenhouse which has good structural strength and resistance to rattling and buffeting, which can be well sealed from the wind and rain, and which can be modified with relative ease to suit the differing requirements in different seasons, to suit the local climate or to provide differing growing requirements. And all this is achieved with a structure that is relatively slender and which provides minimal obstruction to light entering the structure

The invention claimed is:

1. A greenhouse comprising a plurality of panels, and a framework structure which includes channels configured to hold the panels; and wherein the greenhouse is configured to allow at least one of the panels to be replaced, and the framework structure includes at least one movable section of framework that can be moved relative to the panels, and can be moved to a first position in which the at least one movable section of framework retains one or more of the panels within the channels of the framework structure, and can be moved to a second position in which the at least one movable section of framework no longer retains one or more of the panels within the channels of the framework structure and allows one or more of the panels to be removed from the channels of the framework structure, and the at least one movable section of framework forms a part of a top plate of one or more sidewalls of the greenhouse, and when the at least one movable section of framework is moved to the second position, panels of the one or more sidewalls and of one or more roof sections of the greenhouse can be removed from the channels of the framework structure.

2. The greenhouse as claimed in claim 1, wherein the panels are panels selected from the group consisting of: glass panels, polycarbonate panels, acrylic panels, shade panels, screen panels and mesh panels.

3. The greenhouse as claimed in claim 1, wherein the at least one movable section of framework is a slidable section of framework.

4. The greenhouse as claimed in claim 1, wherein the at least one movable section of framework forms a part of a facia panel, gutter or lower rail of one or more roof sections of the greenhouse.

5. The greenhouse as claimed in claim 1, wherein the at least one movable section of framework includes, or forms a part of, one of the channels that are used to hold the panels of the greenhouse.

6. The greenhouse as claimed in claim 1, wherein the framework comprises a plurality of sections made from aluminium extrusions.

7. The greenhouse as claimed in claim 1, wherein the at least one movable section of framework is configured to slide longitudinally within a fixed section of framework of the greenhouse.

8. The greenhouse as claimed in claim 7, wherein the at least one top plate of the greenhouse framework comprises two members, a first top plate member being a fixed member, and a second top plate member being the movable section of framework.

9. The greenhouse as claimed in claim 8, wherein the second top plate member engages with the first top plate member using a longitudinal sliding engagement means.

10. The greenhouse as claimed in claim 1, wherein the greenhouse also includes a compression strip or strips configured to wedge one or more edges of the panels within the channels.

11. The greenhouse as claimed in claim 10, wherein the compression strips are made of a rubberized material.

12. A multi-role horticultural structure comprising the greenhouse as claimed in claim 1.

13. A kit of parts for forming the greenhouse as claimed in claim 1 when assembled, said kit including:

a plurality of sections of framework for use in constructing the framework structure of the greenhouse, a plurality of panels, wherein the panels are panels selected from the group consisting of: glass panels, polycarbonate panels, acrylic panels, shade panels, screen panels and mesh panels, and a quantity of compression strip material configured to securely wedge the panels within the framework structure.

14. The kit of parts for forming the greenhouse as claimed in claim 13, wherein the compression strip material is made of a rubberized material.

15. The kit of parts for forming a greenhouse as claimed in claim 13, wherein the kit of parts includes compression strip material of a plurality of widths.

16. The kit of parts for forming a greenhouse as claimed in claim 13, wherein the sections of framework are formed from aluminium extrusions.

* * * * *